(12) United States Patent
Yamauchi

(10) Patent No.: US 8,967,180 B2
(45) Date of Patent: Mar. 3, 2015

(54) PILOT TYPE PRESSURE REGULATOR

(75) Inventor: Takeshi Yamauchi, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 14/000,577

(22) PCT Filed: Apr. 19, 2012

(86) PCT No.: PCT/JP2012/060580
§ 371 (c)(1),
(2), (4) Date: Feb. 12, 2014

(87) PCT Pub. No.: WO2012/157398
PCT Pub. Date: Nov. 22, 2012

(65) Prior Publication Data
US 2014/0150903 A1   Jun. 5, 2014

(30) Foreign Application Priority Data
May 17, 2011   (JP) .................................. 2011-110210

(51) Int. Cl.
F16K 31/126   (2006.01)
G05D 16/06   (2006.01)
G05D 16/16   (2006.01)
F16K 17/06   (2006.01)

(52) U.S. Cl.
CPC ............ *G05D 16/063* (2013.01); *G05D 16/163* (2013.01); *F16K 17/06* (2013.01)
USPC ................... 137/116.3; 137/488; 137/505.11; 137/505.36

(58) Field of Classification Search
USPC .................. 137/488, 505.11, 505.13, 505.18, 137/505.26, 505.36, 505.37, 115.13, 116.3, 137/116.5
See application file for complete search history.

(56) References Cited

U.S. PATENT DOCUMENTS 2,761,464 A * 9/1956 Faust .......................... 137/116.5
2,963,040 A * 12/1960 Zimmer ................... 137/505.11
2,994,334 A * 8/1961 Loveless ....................... 137/102
(Continued)

FOREIGN PATENT DOCUMENTS

JP   H2-2717   1/1990
JP   H0247705 A   2/1990
(Continued)

OTHER PUBLICATIONS

International Search Report from PCT/JP2012/060580, dated May 22, 2012.
(Continued)

*Primary Examiner* — John Rivell
*Assistant Examiner* — Minh Le
(74) *Attorney, Agent, or Firm* — MKG, LLC

(57) ABSTRACT

A pilot type pressure regulator has: a primary port to which air is supplied from the outside; and a secondary port discharging air regulated by a main valve body provided to a main valve shaft. A main valve diaphragm abutting on an abutting end surface of the main valve shaft partitions an inner space into a secondary pressure chamber communicating with the secondary port and a pilot pressure chamber to which pilot pressure is supplied. This pressure regulator has an exhaust mechanism exhausting air from the secondary pressure chamber to the outside when pressure of the secondary port exceeds a set value. In the exhaust mechanism, a stopper holding a sealing material in a guide hole is inserted from the side close to a main valve hole, that is, an inner end portion.

7 Claims, 12 Drawing Sheets

(56) References Cited

U.S. PATENT DOCUMENTS

| | | | |
|---|---|---|---|
| 3,072,135 A * | 1/1963 | Moskow | 137/116.5 |
| 3,221,762 A * | 12/1965 | Chinn | 137/116.5 |
| 5,443,083 A * | 8/1995 | Gotthelf | 137/484.8 |
| 5,452,741 A * | 9/1995 | Tomita et al. | 137/505.26 |
| 5,586,569 A * | 12/1996 | Hanning et al. | 137/116.5 |
| 6,068,014 A | 5/2000 | Tomita | |
| 6,554,017 B2 * | 4/2003 | Berger | 137/116.5 |
| 6,584,999 B2 * | 7/2003 | Inayama et al. | 137/487.5 |
| 8,342,201 B2 * | 1/2013 | Nitta | 137/505.11 |
| 8,485,213 B2 * | 7/2013 | Hawkins et al. | 137/116.5 |
| 8,869,827 B2 * | 10/2014 | Yamauchi | 137/505.13 |

FOREIGN PATENT DOCUMENTS

| | | |
|---|---|---|
| JP | H04357507 A | 12/1992 |
| JP | 10-268943 A | 10/1998 |

OTHER PUBLICATIONS

"Hydraulics and Pneumatics Handbook", Japan Hydraulics and Pneumatics Association, Ohmsha, Ltd., pp. 461-465, Issued Feb. 25, 1989.

* cited by examiner

PILOT TYPE PRESSURE REGULATOR

TECHNICAL FIELD

The present invention relates to a pilot type pressure regulator for regulating and discharging air to a secondary port from a primary port in accordance with a pilot pressure.

BACKGROUND ART

A pressure regulator, which is also referred to as "regulator", is used for regulating a pressure of compressed air which is supplied from an air pressure source to be a specified pressure, and for supplying the regulated air to a pneumatic equipment such as pneumatic cylinder. This pressure regulator has, for example, as disclosed in Japanese Patent Laid-Open Publication No. 10-268943 and Japan Hydraulics and Pneumatics Association; "Hydraulics and Pneumatics Handbook (New edition)", Ohmsha, Ltd., pp.461-465 (Feb. 25, 1989), a port block formed with: a main valve hole through which a primary port to which compressed air is supplied and a secondary port to which a pneumatic equipment is connected communicate with each other. The port block is mounted with a main valve body for opening and closing the main valve hole, wherein a spring force is applied to the main valve body by a main valve spring member in a direction to close the main valve hole. The pressure regulator of this type has a diaphragm for a secondary pressure chamber to which a pressure of the secondary port is supplied. A main valve shaft provided with the main valve body abuts on the diaphragm.

A pressure regulator with filter is used for regulating the pressure of compressed air to be a specified pressure, and for removing foreign matters such as dust contained in air. The pressure regulator of this type is referred to as "filter regulator", and a mechanism of the pressure regulator has a diaphragm as well as a regulator.

A pressure regulator in which the diaphragm is directly driven by a pressure regulating spring member in an axial direction of the main valve body is referred to as "direct acting type pressure regulator". In this direct acting type pressure regulator, an inner space is partitioned into a secondary pressure chamber and an atmospheric chamber by the diaphragm, and the diaphragm is formed with a relief hole. The relief hole is closed by causing a tip end of the main valve shaft to abut on the diaphragm, and a spring force is applied to the diaphragm in a direction to open the main valve body via the main valve shaft by the pressure regulating spring member. When the pressure of the secondary port drops below a set value, the diaphragm is displaced by the spring force of the pressure regulating spring member. At this moment, the main valve shaft is dislocated by the dislocation of the diaphragm, and the main valve body releases the main valve hole. Then, compressed air of the primary port is discharged to the secondary port. When the pressure of the secondary port becomes equal to a set pressure, the diaphragm is displaced in a direction to detach from the main valve body by the pressure of compressed air which is applied to the diaphragm. As a result, the main valve body closes the main valve hole.

In the above-described direct acting type pressure regulator, a total of the secondary pressure which is applied to the diaphragm, a primary pressure which is applied to the main valve body, and a spring force of the main valve spring member is applied as a thrust in a direction to close the main valve body. On the other hand, a total of the spring force of the pressure regulating spring member and the pressure of the secondary port, which is applied to the valve body, is applied as a thrust in a direction to open the main valve body.

SUMMARY OF THE INVENTION

As for pressure regulators, there is also known a pilot type pressure regulator in which discharge pressure of a secondary port is regulated in accordance with a pilot pressure in addition to one of the above-described direct active type. A pilot type pressure regulator comprises a secondary pressure chamber and a pilot pressure chamber. The secondary pressure chamber and the pilot pressure chamber are separated by a diaphragm. The secondary pressure chamber communicates with a secondary port. A pressure regulator in which primary pressure is supplied to the pilot pressure chamber is referred to as "internal pilot type pressure regulator", and a pressure regulator in which pressure regulated air is supplied to the pilot pressure chamber from the outside is referred to as "external pilot type pressure regulator".

In both types, when the discharge pressure of the secondary port becomes less than a set value, the main valve body is opened via pilot pressure so as to increase the discharge pressure of the secondary port up to the set value. On the other hand, when the pressure of the secondary port exceeds the set value, the secondary port is communicated with the outside via an exhaust mechanism for discharging air of the secondary port to the outside. Therefore, when the pressure of the secondary port exceeds a set value via fluctuations in operating conditions of the pneumatic equipment connected to the secondary port, air in a line connected to the secondary port is discharged to the outside by discharging operations. In such a conventional pilot type pressure regulator, for discharging air of the secondary port, exceeding the set value, an exhaust flow path is formed in the main valve shaft so as to pass through it in its axial direction. However, since the exhaust flow path is formed in the main valve shaft so as to pass through it, and so as to communicate with the outside via an opening portion formed in the port block, a balance chamber cannot be formed by an end portion side of the main valve shaft and the port block. In the above-described pressure regulator with filter, since the filter is disposed on an extension line of the main valve shaft, the exhaust flow path communicating with the outside cannot be formed so as to pass through the main valve shaft.

Accordingly, a radial exhaust hole is formed in the main valve shaft in its radial direction so as to pass through the main valve shaft, and so as to communicate with the axial exhaust hole formed in the main valve shaft in its axial direction. In this way, the balance chamber can be formed by the end portion side of the main valve shaft and the port block, and a pilot type pressure regulator with filter can be constituted by mounting a filter container to the port block.

In order to form radial exhaust hole in the radial direction of the main valve shaft, and to discharge air in the secondary pressure chamber to the outside from an exhaust path formed in the port block, it is necessary to mount a sealing material and an annular stopper for fixing the sealing material to a guide hole for guiding the main valve shaft. In view of mounting workability, it has been tried to mount the sealing material and the stopper from the end surface side of the port block. However, in a structure in which the sealing material and the stopper are mounted from the end surface side of the port block, that is, from the outside, it was found that the stopper is needed to be press-fitted into the guide hole with strong force, or that the stopper is needed to be locked by a pin or the like for securely mounting the stopper.

An object of the present invention is to improve the assembling workability of an exhaust mechanism in a pilot type pressure regulator.

Another object of the present invention is to mount a filter container to a pilot type pressure regulator.

Still another object of the present invention is to prevent an annular stopper constituting the exhaust mechanism from falling from a guide hole even if the stopper is not fixed firmly.

A pilot type pressure regulator according to the present invention, comprises: a port block provided with: a primary port to which compressed air is supplied; and a secondary port communicating with the primary port via a main valve hole, wherein regulated compressed air is discharged from the secondary port, and a main valve shaft provided with a main valve body for opening and closing the main valve hole is mounted in the main valve hole and movable in an axial direction; a main valve diaphragm which is disposed between a mounting end surface of the port block and a pressure regulating adaptor mounted to the mounting end surface, which partitions and forms a secondary pressure chamber communicating with the secondary port and a pilot pressure chamber on the side opposite to the secondary pressure chamber, and which contacts an abutting end surface of the main valve shaft; and an exhaust flow path provided in the port block, wherein air is discharged from the secondary port when the pressure of the secondary port exceeds a set value, wherein an opening portion of the exhaust flow path is provided so as to open on an outer surface of the port block.

According to the pilot type pressure regulator of the present invention, a primary port and a secondary port are formed so as to open on an outer surface of a port block. An exhaust flow path for discharging air in a secondary pressure chamber to the outside is formed so as to open on an outer surface of the port block. In this way, since the exhaust flow path does not open on neither a pressure regulating adaptor side nor an end surface of the port block, the port block can be formed with a balance pressure chamber, and a filter can be mounted to the port block.

DETAILED DESCRIPTION

Figure 3:
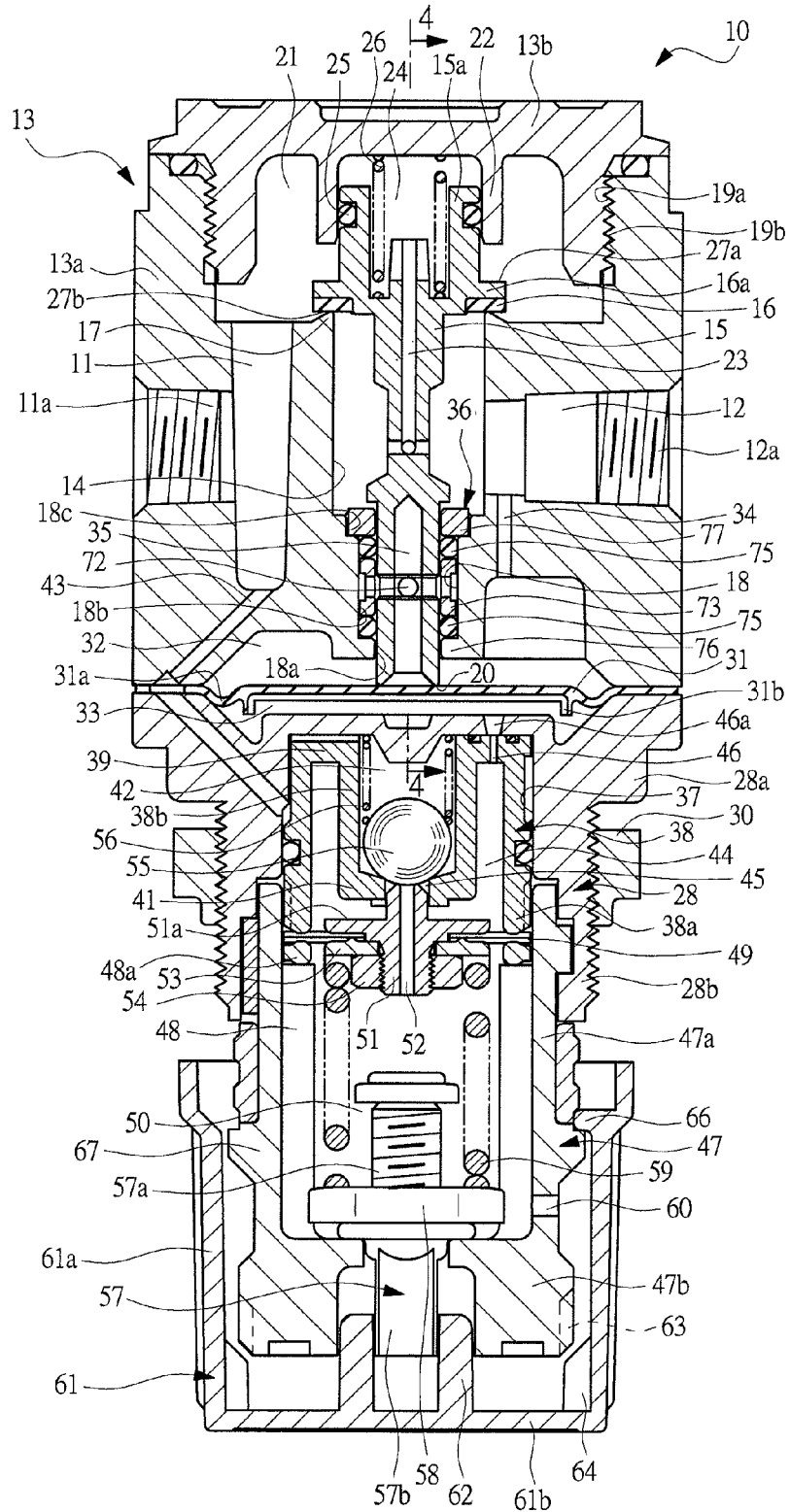
FIG. 3 is an enlarged sectional view taken along the line 3-3 in FIG. 1.

Hereinafter, one embodiment of the present invention will now be explained in details with reference to the drawings. A pilot type pressure regulator 10 has, as shown in FIG. 3, a block main body 13a formed with a primary port 11 and a secondary port 12. Compressed air is supplied to the primary port 11 via a primary piping from an air supply (not shown). The secondary port 12 is connected to a pneumatic equipment via a secondary piping. The primary port 11 is formed with a screw hole 11a for thread connection to the primary piping, and the secondary port 12 is formed with a screw hole 12a for thread connection to the secondary piping. The block main body 13a is formed with the screw holes 11a and 12a in a state where they are axially aligned with each other, and they open on outer surfaces opposite to each other in the block main body 13a. Thus, the two screw holes 11a and 12a are open at different positions of the port block main body 13a. A central portion of the block main body 13a is formed with a main valve hole 14 which extends in an axial direction as a direction perpendicular to each of the screw holes 11a and 12a, and the primary port 11 communicates with the secondary port 12 via the main valve hole 14. An air flow portion which extends from the primary port 11 to the secondary port 12 via the main valve hole 14 constitutes a main flow path portion of the pressure regulator.

A main valve shaft 15 is mounted in the main valve hole 14 and movable in an axial direction. A flange portion 16a larger in diameter than an inner diameter of the main valve hole 14 is provided to one end portion side of the main valve shaft 15, and a main valve body 16 which is made of rubber and which abuts on a main valve seat 17 formed at an opening portion on a communicating side of the main valve hole 14 is provided at the flange portion 16a. The other end portion of the main valve shaft 15 is slidably mounted in a guide hole 18 formed in the block main body 13a. The guide hole 18 has a diameter smaller than that of the main valve hole 14, and the main valve shaft 15 is guided by the guide hole 18 so as to move in an axial direction.

A female screw 19a is formed on an outer end portion of the block main body 13a, and a cover 13b having a male screw 19b for thread connection to this female screw 19a is mounted to the block main body 13a. The cover 13b and the block main body 13a constitute a port block 13. A primary chamber 21 is formed in the port block 13 so as to communicate with the primary port 11, and the main valve hole 14 communicates with the primary port 11 via the primary chamber 21. The cover 13b is formed with a cylindrical guide body 22, a cylindrical sliding portion 15a provided to one end portion of the main valve shaft 15 is slidably fitted to the cylindrical guide body 22. A communication flow path 23 is formed in the main valve shaft 15. This communication flow path 23 opens on one end surface of the main valve shaft 15, and communicates with the secondary port 12. Pressure of the secondary port 12 is supplied via a communication flow path 23, to a balance chamber 24 formed in the cylindrical guide body 22 by the cylindrical guide body 22 and one end surface of the main valve shaft 15. The balance chamber 24 is sealed with respect to the primary port 11 by a sealing material 25 which is mounted in an annular groove of the sliding portion 15a.

A main valve spring member 26 composed of a compression coil spring is mounted in the sliding portion 15a of the balance chamber 24, one end of the main valve spring member 26 abuts on the cover 13b, and the other end abuts on the main valve shaft 15. A spring force is applied to the main valve shaft 15 via this main valve spring member 26. This spring force acts so as to press the main valve body 16 towards the main valve seat 17, and to close the main valve hole 14. As a force to be applied in the axial direction of the main valve shaft 15 by primary pressure of the primary chamber 21, a downward force of the flange portion 16a in the drawing, that is, a thrust to be applied to a primary pressure receiving portion 27a, and an upward force of the flange portion 16a in the drawing, that is, a thrust to be applied to an opposite pressure receiving portion 27b provided on an opposite side of the primary pressure receiving portion 27a the side being one on which the main valve body 16 are defined. These thrusts are substantially cancelled since pressure receiving areas of the thrusts are substantially the same as each other. Since the balance chamber 24 is substantially the same in inner diameter as the main valve hole 14, that is, their pressure receiving areas are substantially the same as each other, a thrust to be applied to the main valve shaft 15 in a direction of closing the main valve body 16 via the secondary pressure of the balance chamber 24, and a thrust to be applied to the main valve shaft 15 in a direction of opening the main valve body 16 via the secondary pressure of the secondary port 12 become substantially equal to each other, so that they are cancelled. In this manner, since axial thrusts of the main valve shaft 15 by the primary pressure and the secondary pressure are substantially cancelled, a force to be applied in the axial direction of the main valve shaft 15 becomes equal to the spring force of the main valve spring member 26.

Figure 1:
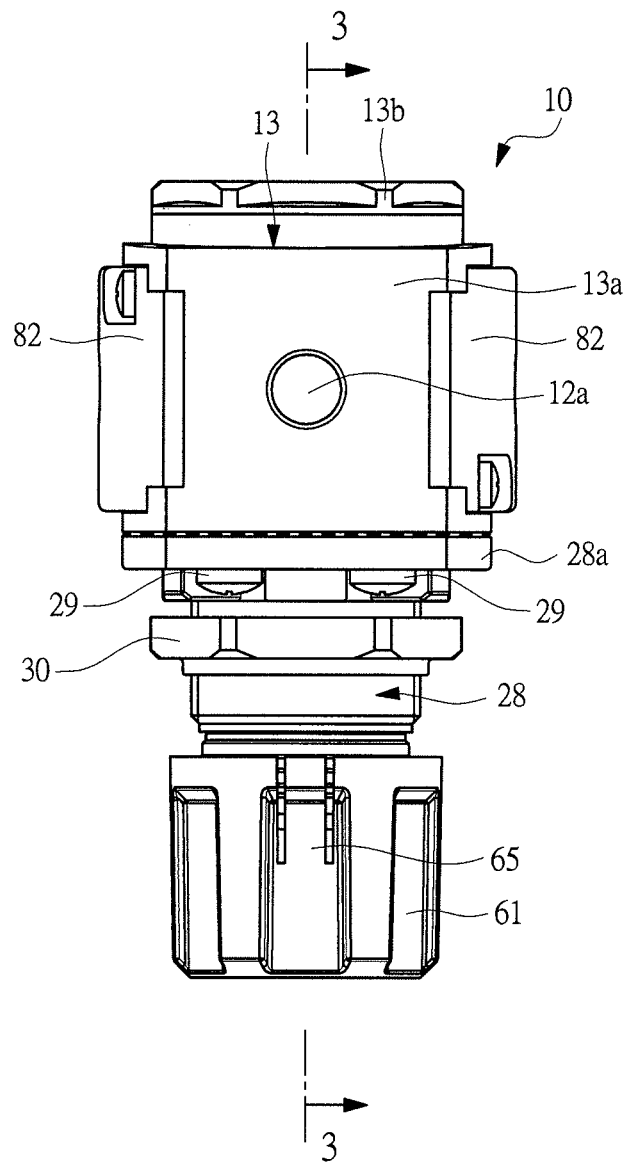
FIG. 1 is a front view of a pilot type pressure regulator according to one embodiment of the present invention.
Figure 2:
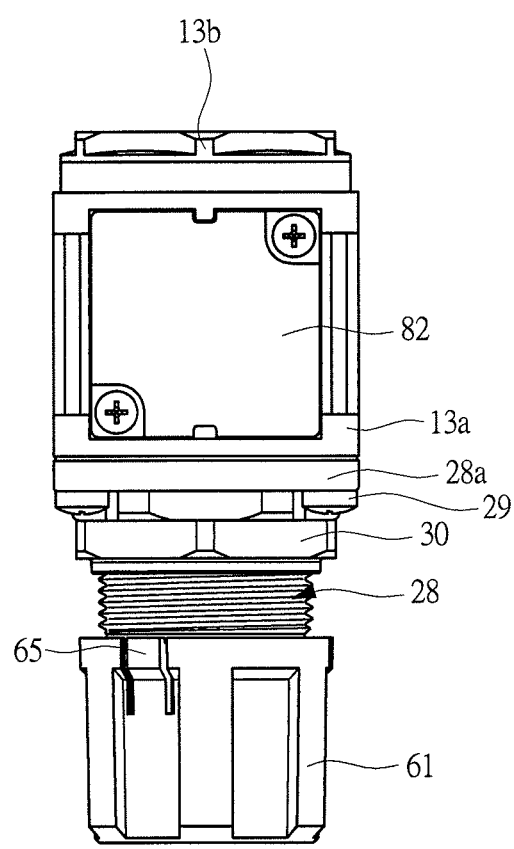
FIG. 2 is a side view of the pressure regulator shown in FIG. 1.

The block main body 13a is mounted with a pressure regulating adaptor 28 having a flange portion 28a and a cylindrical mounting portion 28b. As shown in FIGS. 1 and 2, the pressure regulating adaptor 28 is fastened to the block main body 13a of the port block 13 via the flange portion 28a by four screw members 29, and freely attached and detached, that is, it is detachable. A main valve diaphragm 31 is sandwiched and fixed between the block main body 13a and the pressure regulating adaptor 28. The main valve diaphragm 31 has an elastic deforming portion 31a made of rubber, and a reinforcing disk 31b made of metal or resin and fixed to this portion.

For mounting the pilot type pressure regulator 10 to a member which is not shown in the drawing, the cylindrical mounting portion 28b of the pressure regulating adaptor 28 is formed with a male screw, and as shown in FIG. 2, the male screw is for thread connection to a nut 30.

Concave portions are respectively formed on a mounting end surface of the block main body 13a and a mounting end surface of the pressure regulating adaptor 28, and an inner space is partitioned, by the main valve diaphragm 31 disposed between the block main body 13a and the pressure regulating adaptor 28, into a secondary pressure chamber 32 formed in the concave portion of the block main body 13a and a pilot pressure chamber 33 formed in the concave portion of the pressure regulating adaptor 28. The secondary pressure chamber 32 communicates with the secondary port 12 via a communication hole 34 formed in the block main body 13a, and pressure in the secondary pressure chamber 32 is equal to a secondary pressure the same as that of the secondary port 12. An abutting end surface 20 of the main valve shaft 15 abuts on the main valve diaphragm 31, and this abutting end surface 20 has a seal structure. When the pressure in the secondary pressure chamber 32 becomes less than the pressure in the pilot pressure chamber 33, the main valve diaphragm 31 is elastically deformed upward in the drawing, and the main valve shaft 15 is displaced in an axially-upward direction while the abutting end surface 20 of the main valve shaft 15 maintains the sealed condition. On the contrary, when the pressure in the secondary pressure chamber 32 exceeds the pressure in the pilot pressure chamber 33, the main valve diaphragm 31 elastically deforms downward in the drawing. When the main valve diaphragm 31 further deforms elastically downward in the drawing, since the main valve body 16 abuts on the main valve seat 17, the main valve shaft 15 is not displaced further downward, and the abutting end surface 20 of the main valve shaft 15 is separated from the main valve diaphragm 31, so that the sealing of the abutting end surface 20 is released. As will be described later, the pressure of the primary port 11 is supplied to the pilot pressure chamber 33, and this pilot type pressure regulator is of internal pilot type.

When compressed air is supplied to the pneumatic equipment via the secondary piping connected to the secondary port 12, pressure in the secondary pressure chamber 32 is reduced. As a result, the main valve diaphragm 31 is deformed towards the main valve shaft 15 by the pilot pressure in the pilot pressure chamber 33, that is, the primary pressure so that the main valve body 16 separates from the main valve seat 17. In this manner, compressed air of the primary pressure is supplied from the primary port 11 to the secondary port 12 so as to increase the pressure of the secondary port 12. When the secondary pressure of the secondary pressure chamber is increased, the main valve diaphragm 31 is elastically deformed downward in the drawing against the pilot pressure so that the main valve shaft 15 is displaced downward in the drawing. Therefore, the main valve body 16 contacts and seals the main valve seat 17 as shown in FIG. 3 so as not to supply compressed air to the secondary port 12. In this manner, the pressure of the secondary port 12 is returned to the set value.

A bottomed axial exhaust hole 35 is formed in the end portion of the main valve shaft 15 so as to open on the abutting end surface 20 which is knocked against the main valve diaphragm 31. This axial exhaust hole 35 communicates with the outside via an exhaust mechanism 36, and air flowed into the axial exhaust hole 35 is discharged to the outside via the exhaust mechanism 36. Therefore, when the pressure of the secondary pressure chamber 32 exceeds the pressure of the pilot pressure chamber 33, and the main valve diaphragm 31 elastically deforms in a direction of separating from the main valve shaft 15, air in the secondary pressure chamber 32 is discharged to the outside via the exhaust mechanism 36. For example, when a driving equipment provided on the secondary of the pressure regulator pushes a work in an assembly line of electronic parts which utilizes a pneumatic equipment, and the pressure of the secondary port temporally exceeds pressure in the pilot pressure chamber, compressed air in the secondary piping is discharged to the outside via the exhaust mechanism 36. In this manner, the pressure of the secondary port 12 is returned to the set value.

A valve holder 38 is assembled in a housing hole 37 formed in the pressure regulating adaptor 28. This valve holder 38 has: a cylindrical large diameter body 38*a* which is fitted in the housing hole 37; and a cylindrical small diameter body 38*b* which is disposed so as to form a clearance gap between the cylindrical large diameter body and itself. An end wall portion 39 is coupled to a base end portion of the cylindrical large diameter body 38*a* and a base end portion of the cylindrical small diameter body 38*b*, and faces a bottom surface of the pressure regulating adaptor 28, and a valve seat portion 41 is provided at a tip end portion of the cylindrical small diameter body 38*b* to face towards the bottom surface of the pressure regulating adaptor 28. A pilot flow path 43 is provided so as to pass through the port block 13, the pressure regulating adaptor 28 and an outer peripheral end portion of the main valve diaphragm 31. The pilot flow path 43 further communicates with a valve chamber 42 provided in the cylindrical small diameter body 38*b* and the primary port 11. A communication chamber 44 is formed between the cylindrical large diameter body 38*a* and the cylindrical small diameter body 38*b*. When a pilot valve body 55 (which will be described later) is not seat on the valve seat of the valve seat portion 41, this communication chamber 44 communicates with the valve chamber 42 via a clearance gap formed between a communication hole 45 formed in the valve seat portion and a stem 51 (which will be described later). The communication chamber 44 constantly communicates with the pilot pressure chamber 33 via a communication hole 46 formed in the end wall portion 39 and a communication hole 46*a* formed in the pressure regulating adaptor 28.

A bonnet 47 is mounted on the pressure regulating adaptor 28 in a detachable manner. This bonnet 47 has a cylindrical portion 47*a* which is fitted to the cylindrical mounting portion 28*b* of the pressure regulating adaptor 28, and an end wall portion 47*b* provided to an end portion of the cylindrical portion 47*a*, and the cylindrical portion 47*a* is fitted to the outside of the valve holder 38. A plurality of projecting portions 48 projecting in the radially-inward direction are provided on an inner peripheral surface of the bonnet 47 to extend in axial directions, and the projecting portions 48 are provided at intervals in a circumferential direction. A pilot diaphragm 49 is disposed in the bonnet 47, and the inside of the bonnet 47 is partitioned into a spring chamber 50 and the communication chamber 44 in the valve holder 38 by the pilot diaphragm 49.

An upper surface of an outer peripheral portion of the pilot diaphragm 49 abuts on an annular end surface of the cylindrical large diameter body 38*a* of the valve holder 38. A lower surface of the outer peripheral portion of the pilot diaphragm 49 abuts on a slip washer 48*a* which is pressed upward in the drawing from a lower surface side by the projecting portions 48. The slip washer 48*a* is made of annular resin. Thus, the outer peripheral portion of the pilot diaphragm 49 is sandwiched between the cylindrical large diameter body 38*a* and the slip washer 48*a*. The stem 51 is provided at a radially-center portion of the pilot diaphragm 49. The stem 51 is provided with a through hole 52 causing the valve chamber 42 to communicate with the spring chamber 50, and one end portion of the stem 51 is received in the communication hole 45. The stem 51 is provided with a disk portion 51*a* for covering a center portion of the pilot diaphragm 49 in the communication chamber 44. A reinforcing disk 53 is fixed to the stem 51 by a nut 54. The reinforcing disk 53 is disposed so as to face the disk portion 51*a* via the pilot diaphragm 49.

The pilot valve body 55 made of a steel ball is disposed in the valve chamber 42. A spring force is applied to the pilot valve body 55 by a pilot spring member 56 in a direction in which the communication hole 45 and the valve seat at the end portion of the stem 51 are closed. When the pilot valve body 55 abuts on the valve seat portion 41, the communication hole 45 is closed. The stem 51 has an end portion on the same side as valve chamber 42, this end portion serving as a valve seat on which the pilot valve body 55 abuts, and when the pilot valve body 55 abuts on the valve seat of the stem 51, the through hole 52 is closed. Note that FIG. 3 shows a condition in which both the communication hole 45 and the through hole 52 are closed. Air is allowed to pass through a clearance formed between the pilot valve body 55 and an inner wall of the cylindrical small diameter body 38*b*.

An adjusting screw member 57 is mounted to the end wall portion 47*b* of the bonnet 47 in a freely rotatable manner. A male screw 57*a* is provided at an inner end portion of the adjusting screw member 57, and a pressure regulating spring member 59 composed of a compression coil spring is mounted between a spring seat 58 fixed to the male screw 57*a* by thread connection and the reinforcing disk 53. The pilot diaphragm 49 is applied with thrust directed upward in the drawing by the pressure regulating spring member 59. The pilot diaphragm 49 is applied with thrust directed downward in the drawing by the pilot pressure of the communication chamber 44, the primary pressure of the valve chamber 42, and the pilot spring member 56. The position of the stem 51 in the axial direction is set by a balance of the upward and downward thrusts.

As shown in FIG. 3, when the stem 51 moves upward so as to separate the pilot valve body 55 from the valve seat portion 41, the pilot pressure chamber 33 communicates with the primary port 11 via the communication chamber 44, a clearance gap between an inner peripheral surface of a stem upper end small diameter portion and the communication hole 45, the valve chamber 42, and the pilot flow path 43. With this arrangement, the pilot pressure in the pilot pressure chamber 33 comes closer to the pressure of the primary port 11. Since the valve seat at the end portion of the stem 51 abuts the pilot valve body 55, the through hole 52 is closed. Therefore, the valve chamber 42 and the communication chamber 44 are prevented from being exposed to the spring chamber 50, that is, to the atmosphere. In contrast, when the stem 51 is separated from the pilot valve body 55, the valve chamber 42 is closed by the pilot valve body 55 which contacts the valve seat portion 41. Furthermore, since the valve seat at the end portion of the stem 51 and the pilot valve body 55 separate, the communication chamber 44 communicates with the spring chamber 50 via the through hole 52 of the stem 51. With this arrangement, the pilot pressure chamber 33 communicates with the spring chamber 50 via the communication chamber 44 and the through hole 52. The spring chamber 50 communicates with the outside via a breathing hole 60 formed in the bonnet 47, and when the pilot pressure chamber 33 communicates with the spring chamber 50 via the through hole 52 and the communication hole 45, air in the pilot pressure chamber 33 is discharged to the outside, and the pilot pressure comes closer to the atmospheric pressure of the outside.

As shown in FIG. 3, when the upward and downward thrusts applied to the pilot diaphragm 49 become equal to each other, the pilot valve body 55 closes the communication hole 45 and the stem 51 abuts on the pilot valve body 55 to close the valve seat of the stem upper end, so that the pilot pressure is maintained at the set pressure. Therefore, the pilot pressure in the pilot pressure chamber 33 is adjusted by adjusting a compression stroke of the pressure regulating spring member 59 provided between the spring seat 58 and the pilot diaphragm 49, and by adjusting the spring force to be applied to the pilot diaphragm 49 by the pressure regulating spring member 59. A secondary pressure of compressed air to be discharged to the secondary port 12 is set in accordance with the pilot pressure.

A handle 61 for rotating the adjusting screw member 57 is mounted to the outside of the bonnet 47. This handle 61 has a cylindrical portion 61a which covers an outer peripheral surface of the bonnet 47, and an end wall portion 61b integral with this portion. A fitting portion 62 which is fitted to an outer end portion 57b of the adjusting screw member 57 and slidable in an axial direction is provided to the end wall portion 61b of the handle 61. The outer end portion 57b is formed into a square in cross section, and the fitting portion 62 has an inner peripheral surface formed into a square in cross-section so as to correspond to the outer end portion 57b. Therefore, the adjusting screw member 57 is rotated by rotating the handle 61.

A plurality of engaging grooves 63 extending in the axial direction is formed in the circumferential direction on an outer peripheral surface of the end wall portion 47b of the bonnet 47, and engaging projections 64 which engage with the engaging grooves 63 are provided on an inner peripheral surface of the handle 61. As shown in FIG. 3, when the handle 61 is pulled, the engagement between the engaging projections 64 and engaging grooves 63 is released so that the handle 61 is located at a rotating position. In this rotating position, the handle 61 can be rotated around the bonnet 47. In contrast, when the handle 61 is pressed in the axial direction towards the bonnet 47, the engaging projections 64 engage with the engaging grooves 63, so that the handle 61 is located at a locked position. In this locked position, the handle 61 is prevented from being rotated.

When an operator adjusts the secondary pressure, the handle 61 is moved to the rotating position shown in FIG. 3, and rotated. With this arrangement, the spring seat 58 for thread connection to the male screw 57a is moved in the axial direction of the adjusting screw member 57 so as to change the length of the pressure regulating spring member 59 in the axial direction, so that its spring force is adjusted. On the other hand, when the handle 61 is moved to the locked position and the engaging projections 64 are engaged with the engaging grooves 63, the handle 61 is prevented from being carelessly rotated. As shown in FIGS. 1 and 2, the cylindrical portion 61a of the handle 61 is formed with an engaging portion 65 formed so as to elastically deform in a radial direction by having slits. As shown in FIG. 3, a tip end portion of the engaging portion 65 is formed with an engaging projection 66. The bonnet 47 is formed with a stopper 67, and when the handle 61 is moved to the rotating position, the stopper 67 engages with the engaging projection 66 and prevents the handle 61 from falling off.

Figure 4:
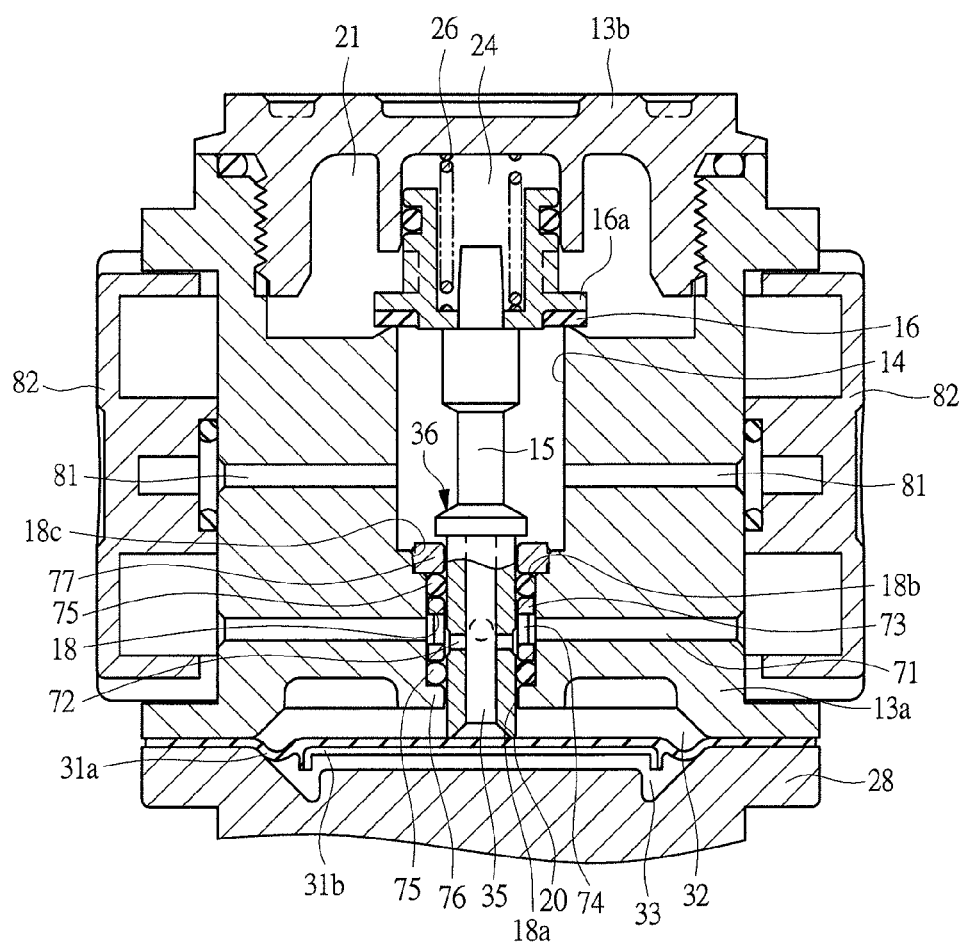
FIG. 4 is a sectional view taken along the line 4-4 in FIG. 3.

FIG. 4 is a sectional view taken along the line 4-4 in FIG. 3, and the above-mentioned exhaust mechanism 36 is shown in FIG. 4.

As shown in FIG. 4, the port block 13 is formed with an exhaust flow path 71 causing the guide hole 18 to communicate with the outer surface of the port block 13. This exhaust flow path 71 opens on the outer surface of the port block 13 at respective positions shifted from the primary port 11 and the secondary port 12. On the other hand, the main valve shaft 15 is formed with radial exhaust holes 72. The radial exhaust holes 72 communicate with the axial exhaust hole 35 opening on the abutting end surface 20 which abuts on the main valve diaphragm 31. The guide hole 18 is composed of: a small diameter hole 18a on a mounting end surface side of the block main body 13a; and a large diameter hole 18b larger in inner diameter than the small diameter hole 18a on the near side of the main valve hole 14. The large diameter hole 18b functions as a hole in which an annular spacer 73 is mounted, and this large diameter hole 18b is formed with an exhaust communication hole 74 causing the radial exhaust holes 72 and the exhaust flow path 71 to communicate with each other. Therefore, the axial exhaust hole 35 and the exhaust flow path 71 communicate with each other via the radial exhaust holes 72 and the exhaust flow path 71.

In the large diameter hole 18b, sealing materials 75 are respectively disposed on radial end portion sides of the annular spacer 73. A clearance gap between the main valve shaft 15 and the guide hole 18 is sealed by the sealing material 75 to prevent air flowed into the axial exhaust hole 35 from discharging to the secondary port 12. Furthermore, air in the secondary pressure chamber 32 is prevented from flowing into the radial exhaust holes 72 and the exhaust flow path 71. The small diameter hole 18a is formed by an inner peripheral surface of a small diameter stopper portion 76 formed at the port block 13. A mounting hole 18c is formed at an inner end portion of the large diameter hole 18b, and an annular stopper 77 is inserted into the mounting hole 18c. The annular spacer 73 and the sealing material 75 are held in the large diameter hole 18b between the annular stopper 77 and the stopper portion 76.

As described above, the axial exhaust hole 35 of the main valve shaft 15 communicates with the exhaust flow path 71 via the radial exhaust holes 72, and this exhaust flow path 71 is orthogonal to a straight line connecting the primary port 11 and the secondary port 12. Therefore, the exhaust flow path 71 opens on two surfaces orthogonal to two surfaces (adjacent surfaces) which are opposite to each other in the hexahedral shape port block 13, and on which the primary port 11 and the secondary port 12 are respectively provided. In other words, the exhaust flow path 71 does not open on a surface on which the pressure regulating adaptor 28 or the cover 13b is provided, and opens on an outer surface different from a surface on which the primary port 11 or the secondary port 12 opens.

In addition, as shown in FIG. 4, it is formed with secondary pressure supply flow paths 81 communicating with the secondary port 12. The secondary pressure supply flow paths 81 can be connected to respective pressure gauges or the like, and port plugs 82 for closing the secondary pressure supply flow paths 81 can be mounted to the port block 13. The opening end surface of the exhaust flow path 71 is covered by the port plugs 82, but air discharged to the exhaust flow path 71 is discharged to the outside via a clearance gap formed between the plug port 82 and the port block 13.

As shown in FIGS. 3 and 4, in order to assemble the exhaust mechanism 36, the sealing material 75 and the annular spacer 73 are inserted into the large diameter hole 18b from a position above the block main body 13a of the port block 13, and the stopper 77 is fitted from above by pressure into the mounting hole 18c formed at the inner end portion of the guide hole 18. With this arrangement, the sealing material 75 and the annular spacer 73 are held between the stopper portion 76 on the mounting end surface side of the port block 13 and the stopper 77 opposite to the stopper portion 76. Thus, since the sealing material 75 and the annular spacer 73 are held by the stopper 77 which is inserted and located behind the stopper portion 76, it is possible to prevent the stopper 77 from falling off the guide hole 18 during operation of the pressure regulator even if the stopper 77 is comprised as a resin ring.

Figure 5A:
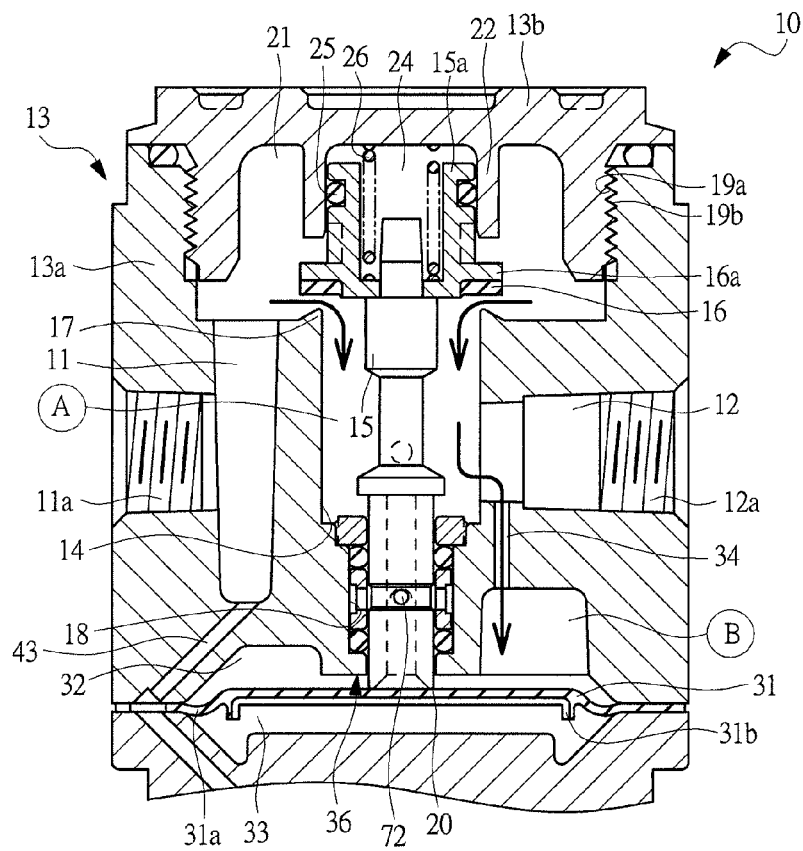
FIG. 5A is a sectional view showing the flow of air in a state where a main valve body is separated from a main valve seat with a secondary port being in a closed state.
Figure 5B:
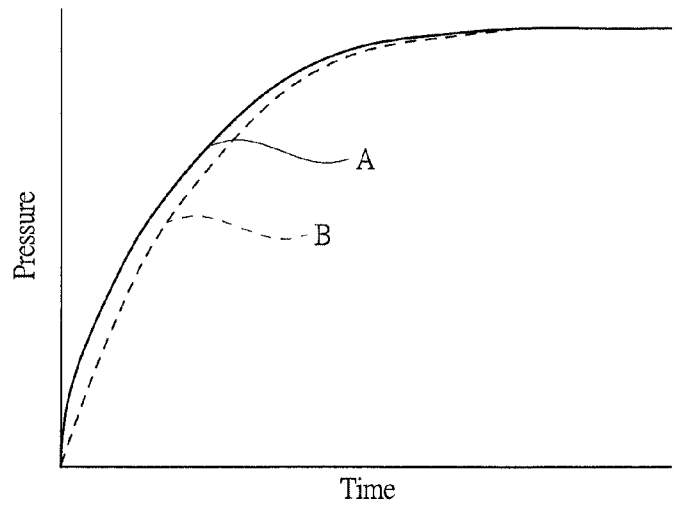
FIG. 5B is a pressure characteristic diagram showing the change of pressure in each of a main valve hole of a main flow path portion of a main valve hole and a secondary pressure chamber with respect to time in this state.

FIG. 5A is a sectional view showing the flow of air in a state where the main valve body 16 is separated from the main valve seat 17 with the secondary port 12 being in a closed state, and FIG. 5B is a pressure characteristic diagram showing the change in pressure "A" in the main flow path portion of the main valve hole 14 and pressure "B" in the secondary pressure chamber 32 at this time. When the main valve body 16 is separated from the main valve seat 17, pressure "A" in the main flow path portion of the main valve hole 14 is firstly increased. With the passage of time, air in the main flow path portion flows into the secondary pressure chamber 32 via the communication hole 34, and pressure "B" of the secondary pressure chamber is gradually increased so as to come close to pressure "A" of the main flow path portion. Therefore, no air pressure will act on the stopper 77 in a direction of detaching the same from the guide hole 18.

Figure 6A:
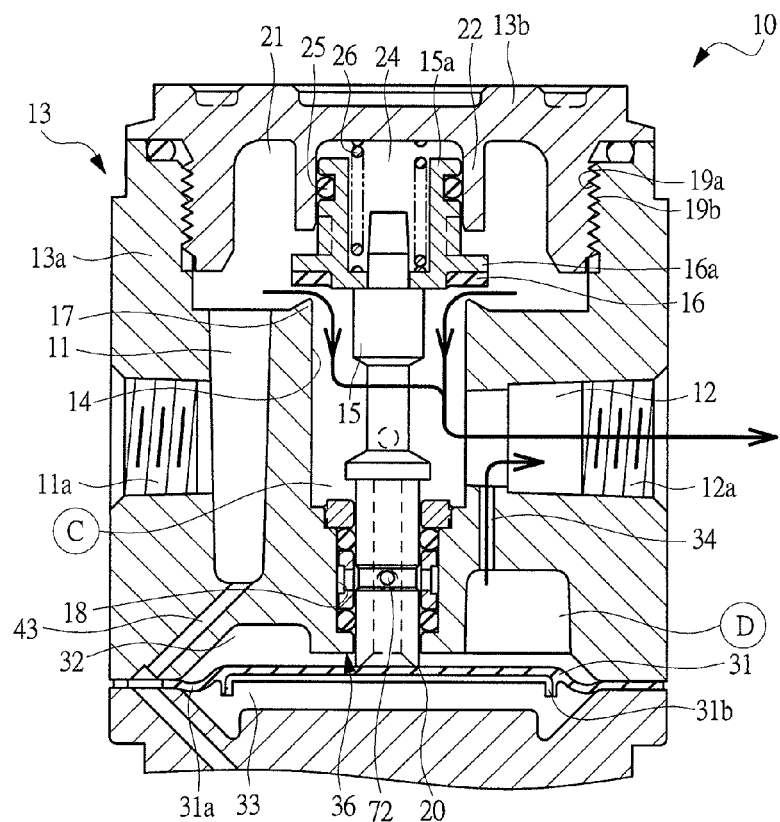
FIG. 6A is a sectional view showing the flow of air in a state where the main valve body is separated from the main valve seat and air flows into the secondary port.
Figure 6B:
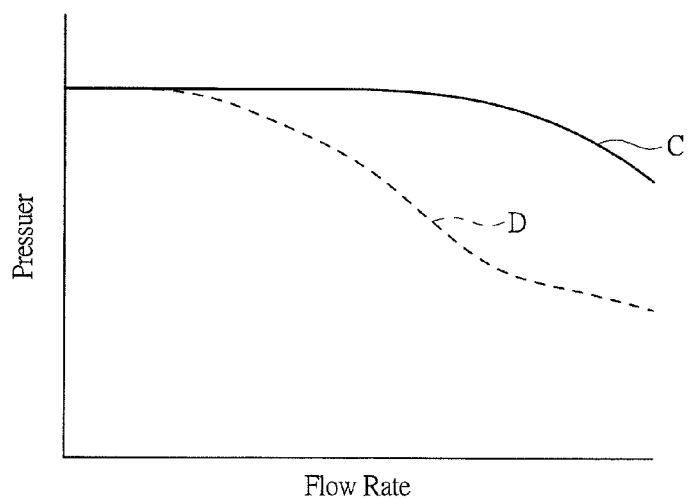
FIG. 6B is a pressure characteristic diagram showing the change of pressure in each of the main valve hole of the main flow path portion of the main valve hole and the secondary pressure chamber with respect to flow rate of air in this state.

FIG. 6A is a sectional view showing the flow of air in a state where the main valve body 16 is separated from the main valve seat 17, and air flows into the secondary port 12, and FIG. 6B is a pressure characteristic diagram showing the change of pressure "C" in the main flow path portion of the main valve hole 14, and pressure "D" in the secondary pressure chamber 32, with respect to the flow rate of air at that time. When the flow rate of air from the main valve hole 14 into the secondary port 12 is small, pressure "C" in the main flow path and pressure "D" in the secondary pressure chamber 32 change in a substantially similar manner. In contrast, when the flow rate of air is increased, air in the secondary pressure chamber 32 is sucked by air flowing through the secondary port 12 via the communication hole 34, so that pressure "D" in the secondary pressure chamber 32 becomes less than pressure "C" in the main flow path. Therefore, air pressure does not act on the stopper 77 in a direction to detaching the stopper 77 from the guide hole 18.

Figure 7A:
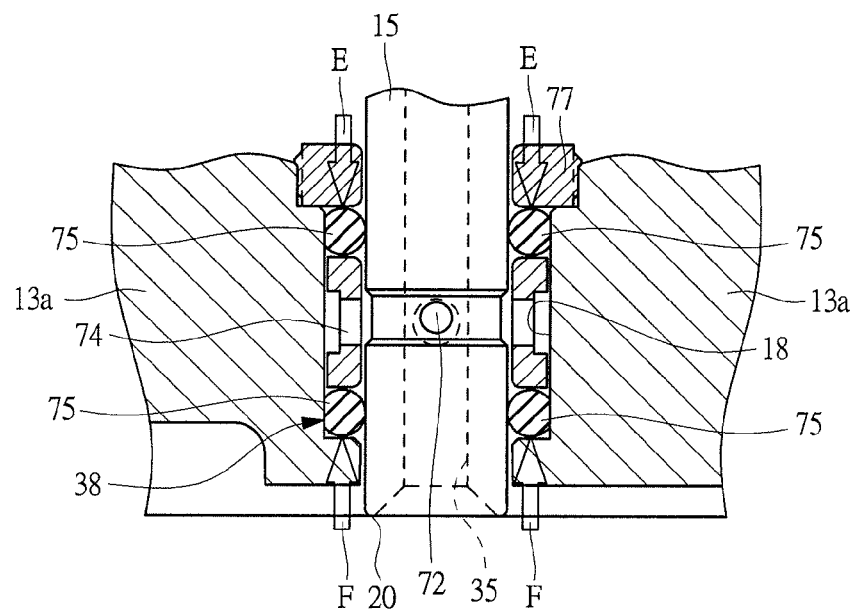
FIG. 7A is a sectional view showing a thrust which is applied to an exhaust mechanism in an axial direction when the main valve body is separated from the main valve seat, and air flows into the secondary port.
Figure 7B:
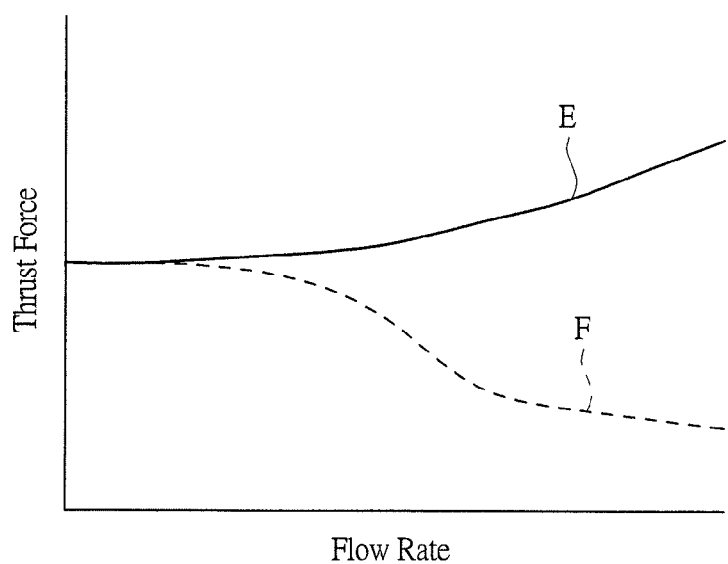
FIG. 7B is a thrust characteristic diagram showing the change of thrust which is applied to the exhaust mechanism in a pressing direction and in a detaching direction with respect to flow rate of air.

FIG. 7A is a sectional view showing a thrust which is applied to the exhaust mechanism 36 in an axial direction when the main valve body 16 is separated from the main valve seat 17 with air is discharged to the secondary port 12, and FIG. 7B is a thrust characteristic diagram showing the relationship of thrust E in a pressing-in direction and thrust "F" in a detaching direction which are applied to the exhaust mechanism 36 in accordance with the flow rate of air. When the flow rate of air flowing into the main valve hole 14 by increasing the opening of the main valve body 16, the dynamic pressure of air increases so that thrust "E" in a pressing-in direction which is applied to the stopper 77 is increased. In contrast, the thrust "F" in a detaching direction is reduced by the above-mentioned suction upon increase of the flow rate of air. Besides, the thrust "F" in a detaching direction does not exceed the thrust "E" in a pressing-in direction. Therefore, air pressure does not act on the stopper 77 in a direction of detaching the same from the guide hole 18.

Figure 8A:
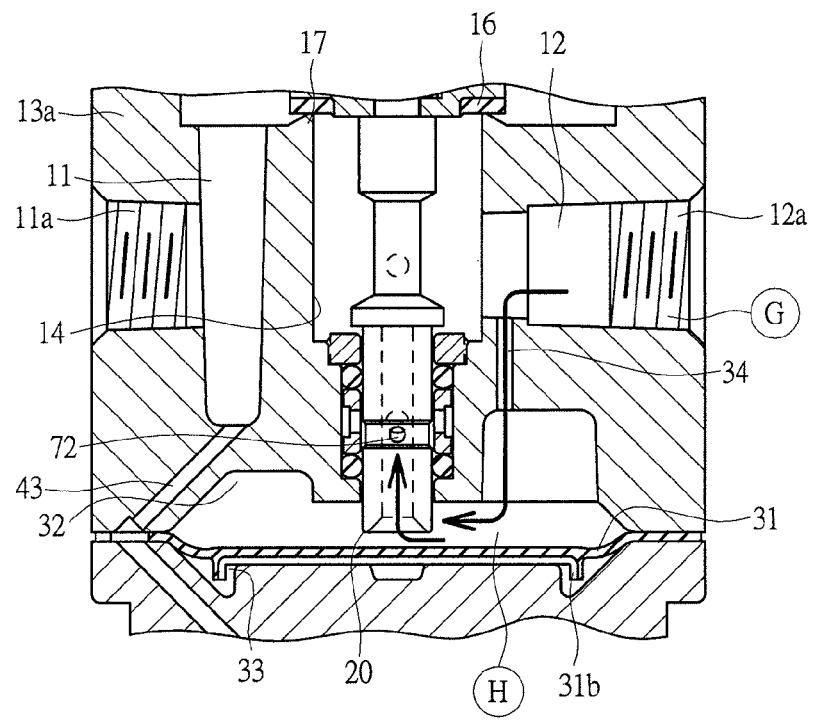
FIG. 8A is a sectional view showing a state in which the pressure of the secondary port exceeds a set value, and a secondary pressure chamber communicates with the outside via the exhaust mechanism at this time.
Figure 8B:
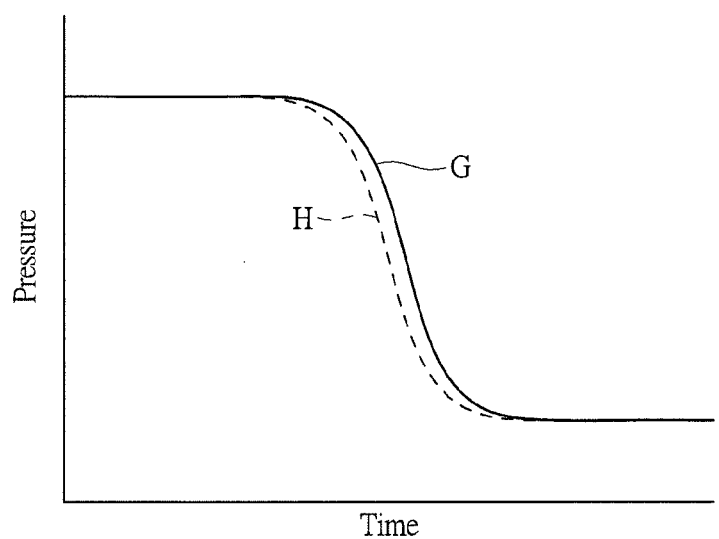
FIG. 8B is a pressure characteristic diagram showing the change of pressure in each of the secondary port and the secondary pressure chamber with respect to time.

FIG. 8A is a sectional view showing a state in which the pressure of the secondary port 12 exceeds a set value, and the secondary pressure chamber 32 communicates with the outside via the exhaust mechanism 36, and FIG. 8B is a pressure characteristic diagram showing the change of pressure "G" in the secondary port 12 and pressure "H" in the secondary pressure chamber 32 at this time. When the main valve diaphragm 31 separates from the abutting end surface 20 of the main valve shaft 15, and air in the secondary port 12 is discharged to the outside via the secondary pressure chamber 32, the secondary pressure chamber 32 is in the vicinity of the exhaust flow path 71 in comparison with the secondary port 12, so that reduction of its pressure is faster than that of the secondary port 12, and the pressure "H" of the secondary pressure chamber 32 does not exceed the pressure "G" of the secondary port 12. Therefore, air pressure does not act on the stopper 77 in a direction to detach the same from the guide hole 18.

As shown in FIGS. 5 to 8, in all of operations of the pilot type pressure regulator 10, it is possible to prevent the stopper 77 of the exhaust mechanism 36 from being pulled from the mounting hole 18c by application of thrust or pressure. With this arrangement, since it is necessary to securely fix the stopper 77 to the mounting hole 18c, the stopper 77 may be made of resin, and it is possible to maintain the sealing material 75 and the annular spacer 73 in the guide hole 18.

Figure 9:
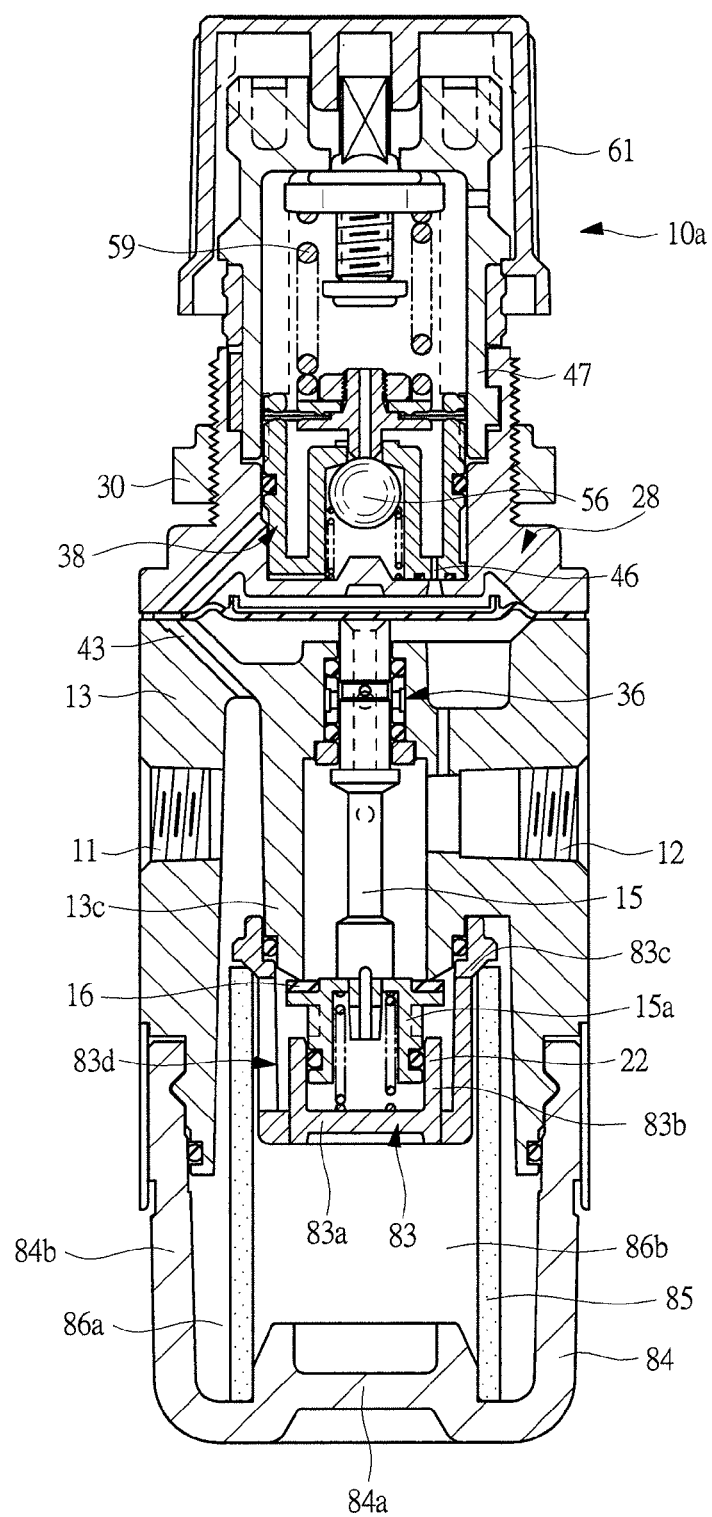
FIG. 9 is a sectional view showing a pilot type pressure regulator according to another embodiment of the present invention.

FIG. 9 is a sectional view showing a pilot type pressure regulator 10a which is another embodiment of the present invention. The pilot type pressure regulator 10a includes a filter, and is generally referred to as a "filter regulator".

In comparison with the pilot type pressure regulator 10 shown in FIG. 3, the pilot type pressure regulator 10a in FIG. 9 is in a vertically-inversed state. A pressure regulating adaptor 28, a bonnet 47 and the like which are the same in structure as those of the pilot type pressure regulator 10 are provided on an upper side of the port block 13 in FIG. 9. The port block 13 is mounted with a holder 83 provided with the cylindrical guide body 22. The holder 83 has a bottom wall portion 83a integral with the cylindrical guide body 22 into which the sliding portion 15a of the main valve shaft 15 fits, and a cylindrical portion 83b integral with this bottom wall portion 83a, and a fitting portion 83c provided at an end portion of the cylindrical portion 83b is fitted to a mounting portion 13c of the port block 13. The cylindrical portion 83b is provided with a plurality of slits 83d causing the inside of the holder 83 to communicate with the outside of the holder 83.

A bowl, that is, a filter container 84 is attached to the port block 13 in a detachable manner. The filter container 84 has a bottom wall portion 84a and a cylindrical portion 84b integral with this portion, and a tip end portion of the cylindrical portion 84b is attached to the port block 13. A cylindrical filter element 85 is disposed in the filter container 84, and as shown in FIG. 9, a lower end portion of the filter element 85 abuts on the bottom wall portion 84a, and its upper end portion abuts on an outside portion of the fitting portion 83c. An inner space of the filter container 84 is partitioned by the filter element 85 into an upstream chamber 86a on the outside thereof and a downstream chamber 86b on the inside thereof, and when air flowed from the primary port 11 passes through the filter element 85, solid particles are removed by the filter element 85. With this arrangement, air supplied to the primary port 11 is filtered and cleaned, and when the main valve body 16 is opened, the cleaned air is supplied to the secondary port 12.

The exhaust mechanism 36 is the same in configuration as that of the pilot type pressure regulator 10 shown in FIG. 3. In an embodiment shown in FIG. 9, a pilot type pressure regulator is provided on the upper side of the port block 13 while a filter is provided on the lower side of the port block 13. An opening portion of the exhaust flow path of the exhaust mechanism 36 opens on a surface adjacent to a surface on which the primary port 11 and the secondary port 12 are provided, but which does not open on the pilot type pressure regulator side or the filter side.

Figure 10:
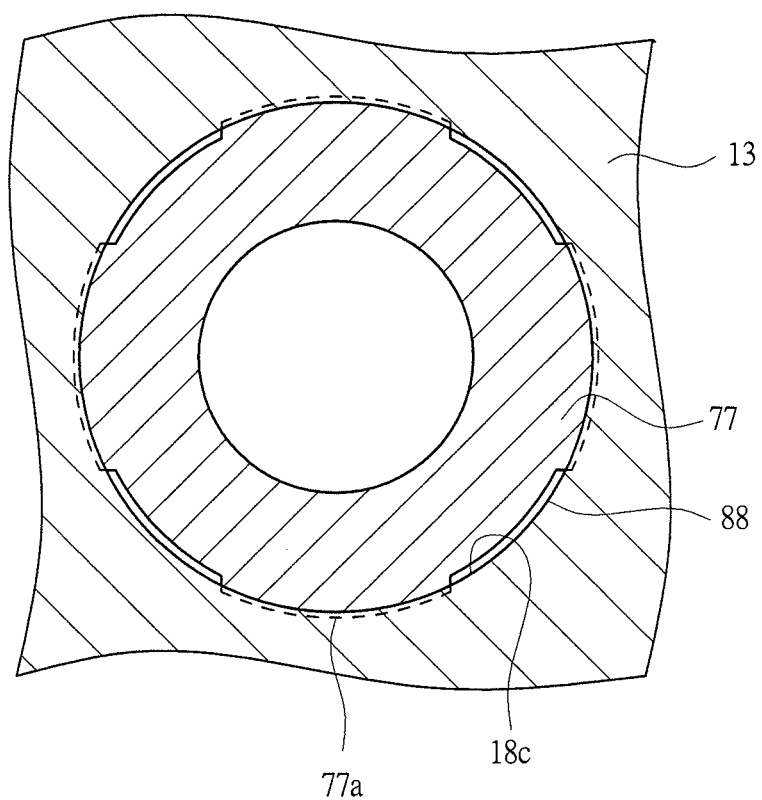
FIG. 10 is an enlarged sectional view of a stopper shown in FIG. 9.

FIG. 10 is an enlarged sectional view of the stopper 77 shown in FIG. 9. Projecting portions 77a projecting in radial directions are provided at constant intervals in the circumferential direction on the outer peripheral surface of the stopper 77. The outer diameter of the projecting portions 77a is set to be larger than the inner diameter of the mounting hole 18c, and when the stopper 77 made of resin is inserted into the mounting hole 18c, the projecting portions 77a elastically deform so as to adhere closely to the mounting hole 18c as indicated by the solid line in FIG. 10. Since clearance gaps 88 are formed between the respective projecting portions 77a in the circumferential direction, it is possible to reduce the operating force for inserting the stopper 77 into the mounting hole 18c.

FIG. 10 is an enlarged sectional view showing the stopper 77 shown in FIG. 9, and this is the same in configuration as the stopper 77 shown in FIGS. 3 and 4. However, it is possible to employ a stopper 77 which is not provided with the projecting portions 77a on the outer peripheral surface thereof, and the stopper 77 could also be made of metal.

Figure 11:
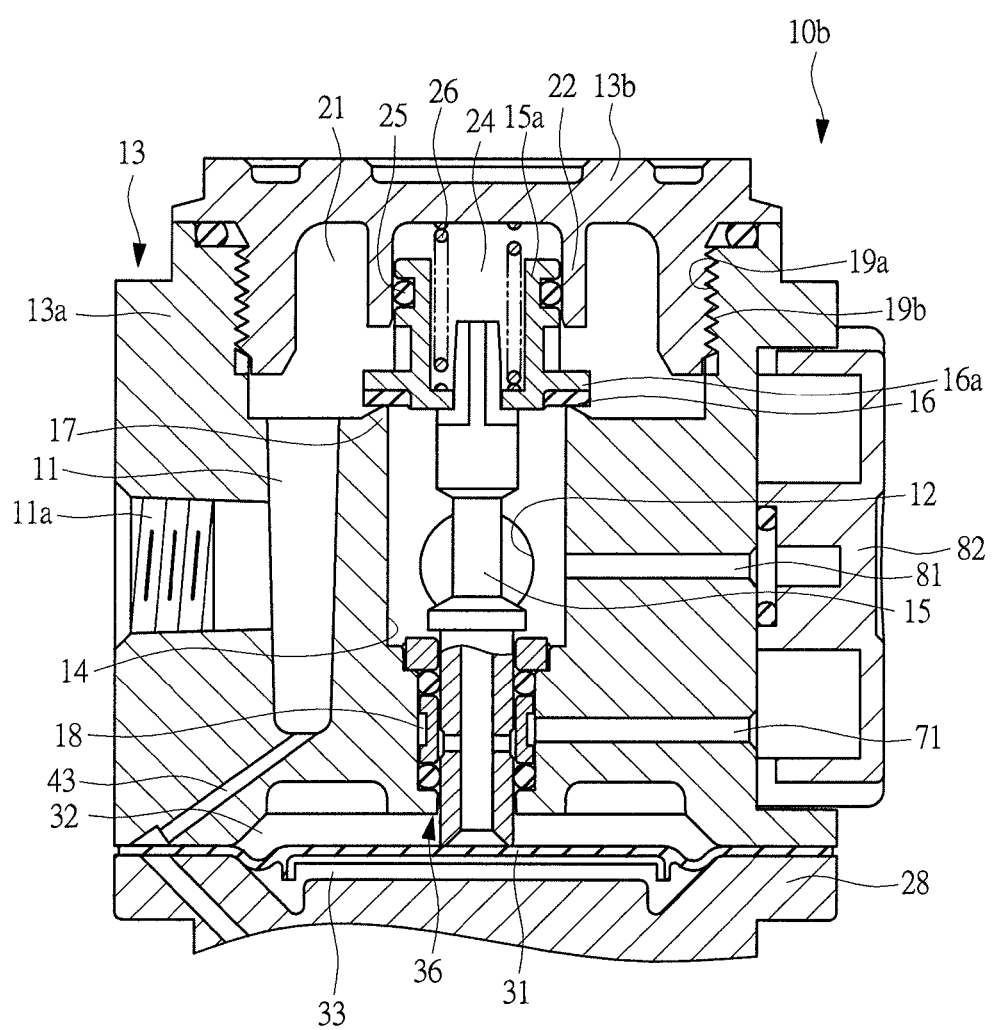
FIG. 11 is a sectional view showing one modification of a port block of the pilot type pressure regulator.
Figure 12:
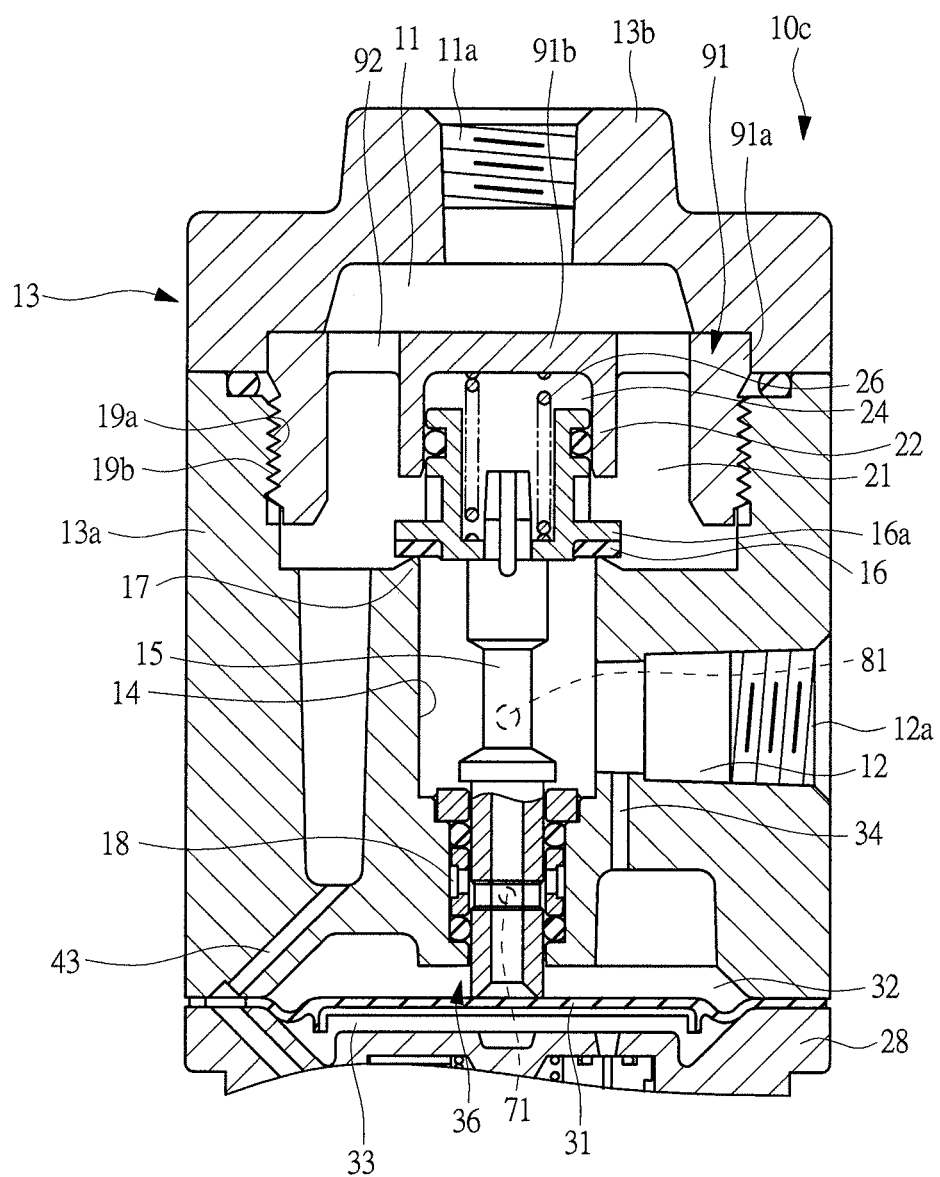
FIG. 12 is a sectional view showing another modification of the port block of the pilot type pressure regulator.

FIGS. 11 and 12 are sectional views each showing a modification of the port block of the pilot type pressure regulator. In FIGS. 11 and 12, members which are in common with the members of the above-mentioned port block 13 are marked with identical reference marks.

In a block main body 13a of a pilot type pressure regulator 10b as shown in FIG. 11, a screw hole 11a of a primary port 11 and a screw hole 12a of a secondary port 12 are arranged so as to be substantially perpendicular to each other with respect to a center of a main valve hole 14. Therefore, the primary port 11 and the secondary port 12 open on outer surfaces of the block main body 13a, which are mutually perpendicular. The block main body 13a is formed with an exhaust flow path 71 which extends in a direction substantially opposite to that of the screw hole 11a of the primary port 11. The exhaust flow path 71 opens on the outer surface of the block main body 13a at a position different from those of the primary port 11 and the secondary port 12.

In a port block 13 of a pilot type pressure regulator 10c shown in FIG. 12, the cover 13b which is fixed to a block main body 13a is formed with a screw hole 11a of the primary port 11. A valve guide 91 is fixed to the cover 13b. The valve guide 91 is integral with: a cylindrical guide body 22 for supporting a main valve shaft 15 in a freely movable manner; and a cylindrical mounting portion 91a larger in diameter than the cylindrical guide body 22, via an end wall portion 91b. The cylindrical mounting portion 91a is provided with a male screw 19b for thread connection to a female screw 19a formed in the block main body 13a. The end wall portion 91b is provided with a plurality of communication holes 92 causing the primary port 11 and the primary chamber 21 to communicate with each other.

While each of the pilot type pressure regulators 10, 10a, 10b and 10c shown in the drawings is of internal pilot type in which air of the primary port 11 is supplied to the pilot pressure chamber 33, a pressure regulator may be of external pilot type in which pilot pressure regulated air is supplied to the pilot pressure chamber 33 from the outside.

The present invention is not limited to the above-mentioned embodiments, but it may be variously changed without departing from the spirit and scope thereof. For instance, while the pilot type pressure regulators 10, 10b and 10c of FIGS. 3, 11, and 12 show conditions in which the handle 61 is located downward, it is possible to use them in a condition in which the handle 61 is located upward similar to the pilot type pressure regulator 10a with a filter as shown in FIG. 9.

This pressure regulator may be applied to an air pressure supply system for supplying pressured air to a pneumatic equipment.

What is claimed is:

1. A pilot type pressure regulator for regulating a pressure of compressed air in accordance with a pilot pressure, the pressure regulator comprising:

a port block provided with: a primary port to which compressed air is supplied; and a secondary port communicating with the primary port via a main valve hole, wherein regulated compressed air is discharged from the secondary port, and a main valve shaft provided with a main valve body for opening and closing the main valve hole is mounted in the main valve hole and movable in an axial direction; and a main valve diaphragm which is disposed between a mounting end surface of the port block and a pressure regulating adaptor mounted to the mounting end surface, which partitions and forms a secondary pressure chamber communicating with the secondary port and a pilot pressure chamber on the side opposite to the secondary pressure chamber, and which contacts an abutting end surface of the main valve shaft wherein the port block is provided with an exhaust flow path in which air is discharged from the secondary port when the pressure of the secondary port exceeds a set value, wherein an opening portion of the exhaust flow path is provided so as to open on an outer surface of the port block, wherein the main valve shaft is provided with: an axial exhaust hole formed so as to open on the abutting end surface; and a radial exhaust hole causing the exhaust flow path and the axial exhaust hole to communicate with each other.

2. The pilot type pressure regulator according to claim 1, further comprising a guide hole formed in the port block, the guide hole having: a small diameter hole on the side close to a mounting end surface of the port block; and a large diameter hole on the main valve hole side, the guide hole guiding the main valve shaft in a freely slidable manner, wherein an annular spacer formed with an exhaust communication hole for communicating the abutting end surface of the main valve shaft with the exhaust flow path, is attached into the large diameter hole, and a sealing material is attached on both sides of the annular spacer in the axial direction.

3. The pilot type pressure regulator according to claim 2, further comprising: a stopper which is inserted into the large diameter hole from the main valve hole side, and holds the sealing material in the large diameter hole, wherein the stopper is provided at an inner end surface portion of the guide hole.

4. The pilot type pressure regulator according to claim 3, wherein the stopper is made of resin.

5. The pilot type pressure regulator according to claim 1, wherein air in the primary port is supplied to the pilot pressure chamber as internal pilot pressure.

6. The pilot type pressure regulator according to claim 1, wherein air is supplied to the pilot pressure chamber from the outside as external pilot pressure.

7. The pilot type pressure regulator according to claim 1, wherein a filter container into which a filter element for filtering air flowing from the primary port towards the secondary port is assembled is attached to the port block in a detachable manner to remove foreign matters contained in air flowing into the primary port.

* * * * *